United States Patent [19]

Crawford

[11] Patent Number: 5,754,176
[45] Date of Patent: May 19, 1998

[54] POP-UP HELP SYSTEM FOR A COMPUTER GRAPHICAL USER INTERFACE

[75] Inventor: Chris Crawford, Fort Worth, Tex.

[73] Assignee: AST Research, Inc., Irvine, Calif.

[21] Appl. No.: 538,017

[22] Filed: Oct. 2, 1995

[51] Int. Cl.[6] .................................................. G06F 3/00
[52] U.S. Cl. .................................................. 345/338
[58] Field of Search .......................... 395/338, 336, 395/353, 347

[56] References Cited

U.S. PATENT DOCUMENTS

| | | | |
|---|---|---|---|
| 4,789,962 | 12/1988 | Berry et al. | 395/338 |
| 5,155,806 | 10/1992 | Hoeber et al. | 395/338 |
| 5,287,448 | 2/1994 | Nicol et al. | 395/338 X |
| 5,434,965 | 7/1995 | Matheny et al. | 395/338 |
| 5,442,687 | 8/1995 | Miller | 379/100 |
| 5,471,575 | 11/1995 | Giansante | 395/338 X |
| 5,483,632 | 1/1996 | Kuwamoto et al. | 395/338 |
| 5,546,521 | 8/1996 | Martinez | 395/338 |

*Primary Examiner*—A. Katbab
*Attorney, Agent, or Firm*—Knobbe, Martens, Olson & Bear LLP

[57] ABSTRACT

A system for implementing a pop-up help system for a computer graphical user interface is disclosed. In a departure from the art, the pop-up help system provides help information on graphical display elements (GDEs), such as icons and text instructions, in the form of a help window that is not character or format limited and that is displayed when the associated GDE is selected. The pop-up help system also allows direct access to additional help information and provides for the display of graphics and the execution of multimedia objects. The pop-up help system comprises a GDE (a "help window"), which is displayed when the mouse pointer is moved over a GDE associated therewith. The help window comprises information regarding the associated GDE and may comprise multimedia objects or user activated buttons for accessing additional help information or for performing other actions. The help window is displayed until the neither the help window or GDE are selected and a user-specified time period has elapsed.

30 Claims, 4 Drawing Sheets

POP-UP HELP SYSTEM FOR A COMPUTER GRAPHICAL USER INTERFACE

TECHNICAL FIELD

The invention relates generally to user interfaces for computers and, more particularly, to a pop-up help system for a computer graphical user interface.

BACKGROUND OF THE INVENTION

Graphical user interfaces, or "GUIs" as they are often designated, have become an increasingly common and popular feature of computers, especially personal computers (PCs). One of the many advantages of such GUIs is that they allow a user to enter commands by selecting and manipulating graphical display elements (GDEs), such as icons, usually with a pointing device, such as a mouse. A mouse is an input device which, when moved over a surface, moves a mouse pointer across the PC display in a corresponding manner. Typically, a mouse has at least two buttons which when pressed, generate to the PC an input relating the user and the location of the mouse pointer on the PC display. "Clicking" will be used herein to refer to the pressing and releasing of a mouse button, usually the left mouse button, unless otherwise specified. The icons of a GUI are designed to behave in a manner similar to the objects they represent. The Apple Macintosh user interface and Microsoft Windows operating environment are two common and very popular examples of GUIs, illustrating the fact that the advantages of GUIs over conventional text-based user interfaces are widely recognized.

One of the principal advantages GUIs have over text-based user interfaces is the reduction in the amount of information that a user must recall in order to effectively use the PC. For example, instead of having to remember the name of an application program and the location of the program on a particular disk and within a particular folder or directory, the user need only remember the icon associated with the application. Once the icon is located, the user merely places the mouse pointer over the icon and clicks on the icon to activate the application. However, with the advent and introduction of increasingly powerful PCs and the rapidly growing array of application programs, the number of associated icons on the PC desktop has mushroomed. Moreover, each individual application may contain hundreds of individual commands which are typically represented by either terse linear instructions or additional icons. When confronted with so many applications and instructions, even in iconized form, it is often difficult for a user to determine which icon will allow him or her to perform a desired function.

This problem is exacerbated by the fact that many icons and instructions are grouped as a series of linear menus. Generally, a linear menu comprises an initial menu that is displayed on the PC's display and includes a plurality of menu picks each of which, when selected by a user, results in the display of another menu associated with the selected menu pick. This continues until the user makes a final selection associated with an application or instruction. Therefore, unless a user is intimately familiar with all of the successive menus, as well as the respective menu picks thereof, navigation using a succession of linear menus can be extremely complicated, in that a user must know exactly which pick to make from each menu in order to implement the desired functionality.

Additionally, as discussed above, many applications have far more instructions than a typical PC user normally uses. One of the reasons for the unused functionality is that the user seldom has the time to investigate "mystery" commands that are present on the desktop. This increasingly leads to underutilization of application programs and user inefficiency. For example, with the limited time available to most PC users, they are often driven to explore new options only when their particular demands necessitate. They seldom have the opportunity to explore various options with the goal being the uncovering of new and useful functionality which they had not previously used.

In order to remedy the above deficiencies, attempts have been made to provide "help" sub-programs designed to assist users with the selection of particular applications and instructions, as well as to provide a mechanism to assist users in learning the various functions of particular applications. As users of PCs will readily appreciate, in order to use standard help commands, a user is often required to discontinue the particular action being undertaken, locate and access a help sub-program, follow the instructions and menus provided by the help sub-program, find the action desired, read the help information on the particular topic, then remember that information and execute the instructed actions after exiting the help sub-program. This form of help is difficult to efficiently utilize and, based on its interaction, is almost exclusively used to find a method to perform a particular function once the user knows the function they desire to perform.

Other examples of help features are found in the Apple Macintosh operating system's "balloon help" and the various Microsoft Windows systems' "tooltips." Both of these features are used primarily to provide information in connection with small GDEs. For example, a small button with an obscure graphic might have associated therewith a tooltip comprising a small text box that provides a short description of the button, such as the menu name for the particular function, which is displayed when the mouse pointer is placed over the button for a predetermined period of time. However, these tooltips and balloon help windows have been used almost exclusively in connection with buttons, are limited to providing only eighty (80) characters of text, with no text formatting and word wrapping, and do not provide direct access to help sub-programs. Clearly, the inability to provide more than eighty (80) characters of text, as well as the inability to access help sub-programs directly from the text box severely limit the effectiveness of these help features.

Clearly, current GUIs have significant limitations. Accordingly, what is needed is a pop-up help system that directly provides help information as the user encounters icons and instructions, that is capable of directly providing access to additional help information, and that is not limited to providing only textual information in a static format.

SUMMARY OF THE INVENTION

The foregoing problems are solved and a technical advance is achieved by a system for implementing a pop-up help system for a computer user interface. In a departure from the art, the pop-up help system of the present invention provides help information in connection with GDEs, such as icons, buttons, windows and text, in the form of a help window that is not character- or format-limited and that is displayed when a GDE is selected by the user's resting the mouse cursor over the GDE for a preselected period of time. The pop-up help system also enables direct access to additional help information through additional buttons within a help window and provides for the display of graphics and the execution of multimedia objects.

In a preferred embodiment, the pop-up help system comprises a GDE, hereinafter referred to as a "help window," that is displayed when the mouse pointer is moved over another GDE with which the help window is associated. The help window comprises information regarding the associated GDE and may comprise multimedia objects or user-activated buttons for accessing additional help information or for performing other actions related to the GDE. The help window is displayed until neither the help window or GDE are selected, i.e., until the mouse pointer is moved off of the GDE and help window, and a preselected time period has elapsed.

In one aspect of the invention, the pop-up help system determines whether the help window would be displayed too close to the edge of the display, such that a portion of the help window would extend beyond the edge of the display, and automatically repositions the help window so that all of the help window is visible on the display.

In another aspect of the invention, the user may alter certain aspects of the behavior of the help window via a pop-up menu associated therewith, which menu is accessible by clicking the right mouse button while the mouse pointer rests on the help window.

A technical advantage achieved with the invention is that it provides help information as the user selects GDEs.

A further technical advantage achieved with the invention is that it allows direct access to additional help information via buttons and other GDEs within the help window.

Yet another technical advantage achieved with the invention is that it enables the use of graphics and multimedia objects in connection with help windows to provide emphasis on certain features and additional information on selected GDEs to the user.

DESCRIPTION OF THE PREFERRED EMBODIMENTS

Figure 1:
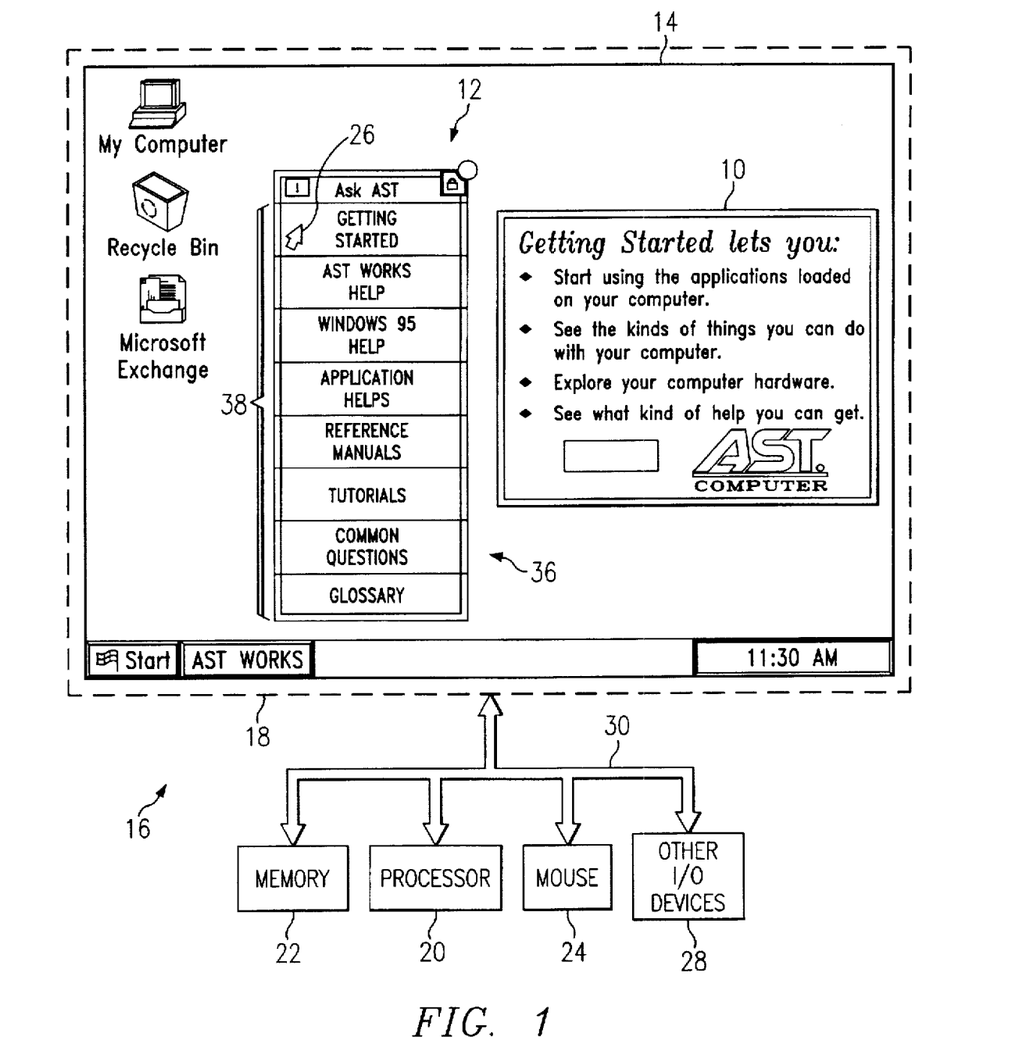
FIG. 1 illustrates a computer system for implementing a GUI employing a pop-up help system of the present invention.

Referring to FIG. 1, a help window 10 of a pop-up help system of the present invention is shown in connection with a spot GDE 12, hereinafter referred to as a "spot interface," as described below, both overlaid on a window 14 of a graphical user interface (GUI). In the illustrated embodiment, the window 14 is the main window of the Windows 95 GUI developed by Microsoft Corporation of Redmond, Wash. Although the preferred embodiment of the pop-up help system of the present invention includes the use of the spot interface 12 in connection with the Windows 95 GUI, it is anticipated that the pop-up help system can be implemented in any number of different GUI operating systems and environments. It is understood that the help window 10, spot interface 12 and window 14 are generated by a PC 16 comprising a display 18, a central processing unit (CPU) 20, storage media 22, a mouse input device 24 for manipulating a mouse pointer 26 and other input/output ("I/O") devices 28, including a keyboard, interconnected in a conventional manner via a bus 30. As used herein, the term "storage media" is intended to comprise any number and combination of electronic storage devices, for example, RAM, ROM, CD-ROM and hard disk drives.

Figures 2, 4A:
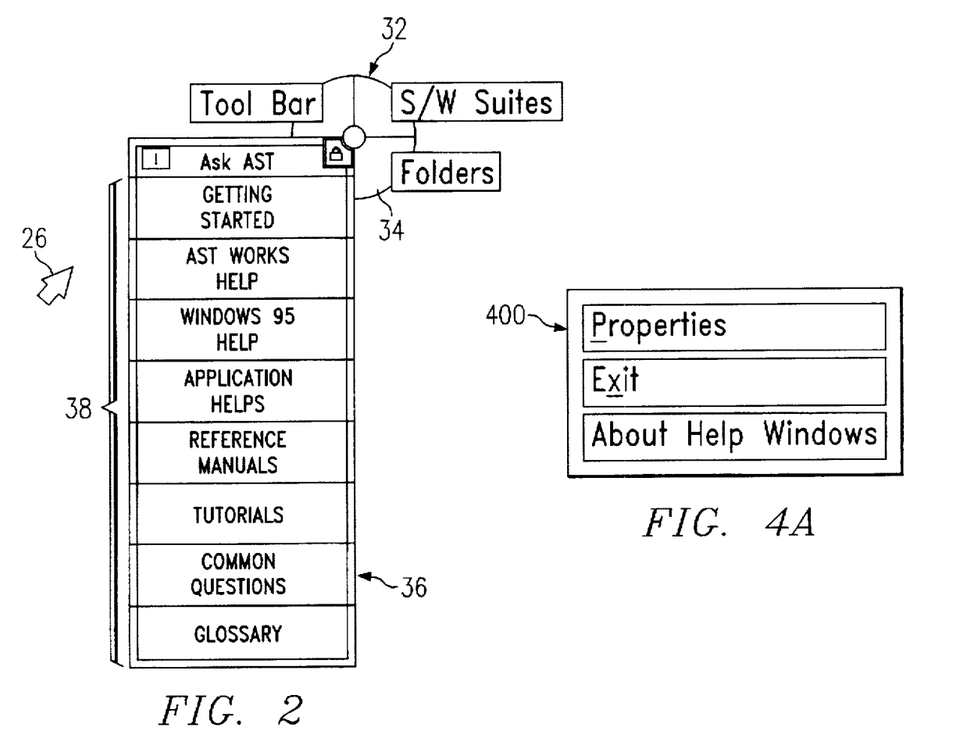
FIG. 2 illustrates a GUI for use with the present invention.
FIG. 4A illustrates a pop-up menu associated with the pop-up help system of the present invention.

The spot interface 12, as more fully described in commonly-owned copending U.S. patent application Ser. No. 08/431,280 (Atty. Docket No. 17705.53), filed Apr. 28, 1995, the disclosure of which is hereby incorporated by reference in its entirety, is designed to float on top of the window 14 and all other open windows without obstructing much, if any, of the information displayed thereon. Referring to FIG. 2, placement of the mouse pointer 26 over the spot interface 12 results in the display of a collar 32 encircling the spot interface 12. When first displayed, the collar 32 comprises four quadrants, such as the quadrant 34, each of which correspond to a secondary interface. Movement of the mouse pointer 26 into one of the quadrants results in the immediate display of the corresponding secondary interface. In particular, as shown in FIGS. 1 and 2, one of the quadrants of the collar 32 corresponds to a secondary interface 36, designated "ASK AST." The ASK AST interface 36 comprises a plurality of access buttons 38, each of which corresponds to a particular task or tasks, such that selection of one of the access buttons 38 opens, or launches, the corresponding task.

Referring now to FIG. 1, the help window 10 is displayed by placing the mouse pointer 26 on a "hot zone," in this embodiment access button 38, for a preset period of time. A hot zone is a GDE or other mouse pointer-sensitive area, on the PC desktop. In accordance with a feature of the present invention, a hot zone may take on any shape or size and may be associated with any of a number of types of GDEs, such as an access button 38 or the spot interface 12. Display of the help window 10 occurs without the user having to click on any element using the mouse 24; rather, simply moving the pointer 26 into a hot zone will cause a help window 10 associated with that hot zone to be displayed. In the embodiment shown, the help window 10 is displayed in connection with the mouse pointer 26 resting over the GETTING STARTED button 38 hot zone. As shown, the help window 10 is itself a GDE, or window, that describes the use and functionality of the GETTING STARTED button 38. By associating help windows 10 with all application icons and instruction text in an application, so-called "mystery commands" are eliminated and the user is greatly assisted navigating and activating menus and applications. In a preferred embodiment, as long as the mouse pointer 26 is positioned over the help window 10 or the hot zone, the help window 10 will continue to be displayed. Only after the mouse pointer 26 is moved outside the help window 10 and the hot zone will the help window 10 be concealed after a predetermined delay.

Also as shown in FIG. 1, the help window 10 is not character and format limited, as in pre-existing help box systems, such as tool tips and balloon help. As a result, a variety of character pitches and fonts, as well as graphical elements, can be displayed within the help window 10. While the help window 10 is shown in this embodiment as a rectangle, the pop-up help system allows the help window 10 to be displayed as any arbitrary shape or size. Although not shown, it is understood that the help window 10 may also be displayed with an attractive background, and associated sounds, music, pictures and movies may be played along with the help window 10. These actions enable the help window 10 to draw attention to itself and to provide visual and aural content to the user in a manner that has heretofore been unavailable.

Figure 3:
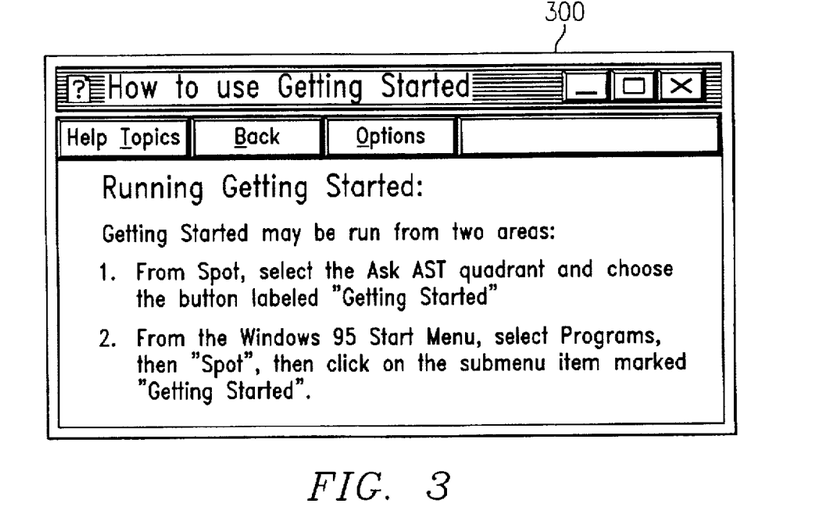
FIG. 3 illustrates a help window of the pop-up help system of the present invention.

Additionally, as shown in FIG. 1, the help window 10 may contain any number of buttons, such as button 10a, enabling the user directly to access additional help windows, such as the window 300 shown in FIG. 3, or to assist the user in directly carrying out desired tasks. It should be recognized that the button 10a operates in a conventional manner in that they enable the user to open additional windows or initiate execution of application programs simply by clicking on the appropriate button(s).

In a preferred embodiment of the pop-up help system, before a help window is displayed, a determination is made whether its default location on the desktop is too close to the edge of the display 18 such that a portion of the help window would extend beyond the edge of the display 18. If this condition is determined, the help window is automatically repositioned to the side of the access button 38 such that all of the help window is visible on the display 18.

In one aspect of the invention, various features of the help window may be customized by the user. In particular, clicking the right mouse button while the mouse pointer 26 is positioned over any part of the help window 10 causes a pop-up menu 400, as shown in FIG. 4A, to be displayed. In the illustrated embodiment, the menu 400 includes three menu picks, including "About Help Windows," selection of which results in the display of a dialog box informing the user about the help windows interface, "Exit," selection of which results in the display of a message box informing the user that he or she is about to exit the help windows menu 400 and prompting the user to confirm whether he or she wishes to exit, and "Properties," the purpose of which is described in greater detail below.

Figure 4B:
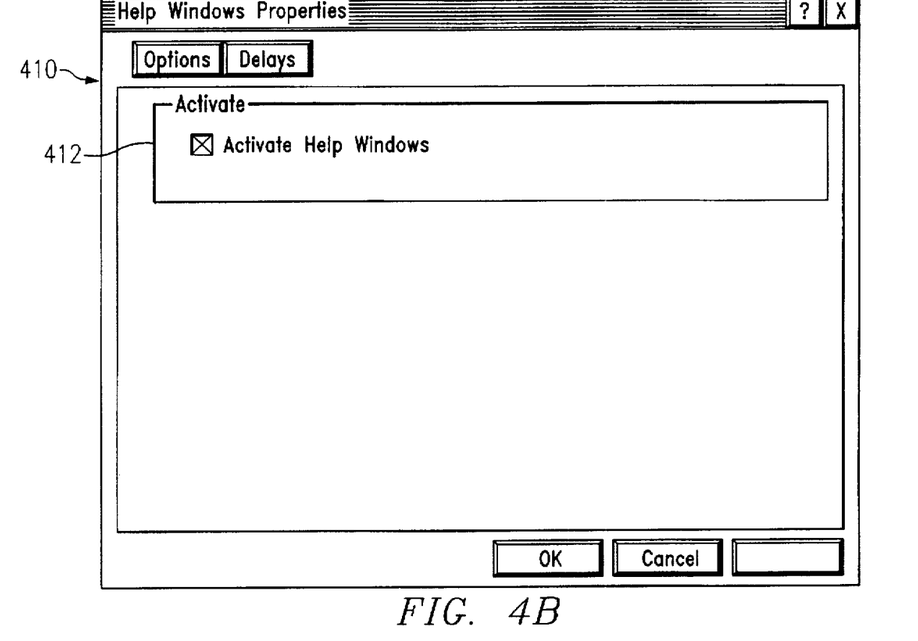
FIG. 4B illustrates an Options page for enabling a user to specify various functional features of the pop-up help system of the present invention.
Figure 4C:
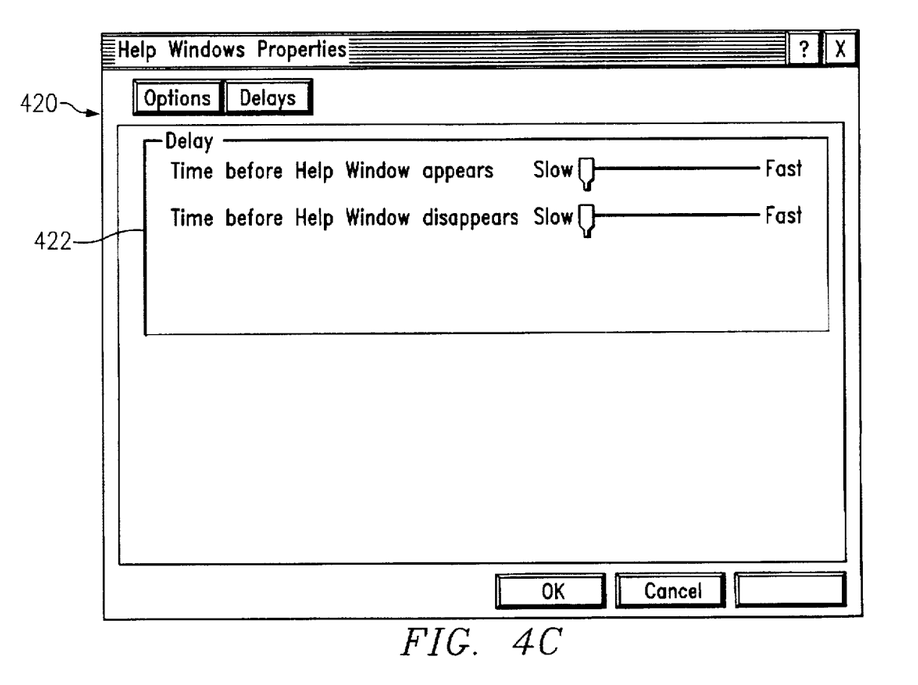
FIG. 4C illustrates a Delays page for enabling a user to specify various aspects of the behavior of the pop-up help system of the present invention.

In particular, clicking on the Properties menu pick results in the display of a tabbed dialog box comprising an "Options" page and a "Delays" page. An exemplary Options page 410 is shown in FIG. 4B. The Options page 410 enables a user to modify the behavior of the help windows of the pop-up help system by specifying, in an "Activate" section 412, whether help windows are to be displayed In addition, the Properties dialog box has a page for "Delays." An exemplary Delays page 420 is shown in FIG. 4C. The Delays page 420 enables a user to modify the behavior of the help windows 10 by specifying, in a "Delay" section 422, the time delay between the mouse pointer 26 being positioned over the hot zone, such as button 38, and the help window 10 being displayed, as well as the time delay between the mouse pointer 26 being moved off the help window 10 and the help window 10 being concealed.

Although it is anticipated that most users will find it more convenient to interact with the system of the present invention using the mouse 24, the system is also easily manipulated using a keyboard. In particular, when the help window 10 is displayed by the user positioning the mouse pointer over a hot zone in any conventional fashion, a help window, such as the help window 10, will automatically be displayed, just as if the user had moved the mouse pointer 26 over the access button 38. As shown in FIG. 1, the button 10a, which appears on the help window 10, has an underlined letter, just like menu items, in order to facilitate keyboard selection of a button on the help window 10.

Figure 5:
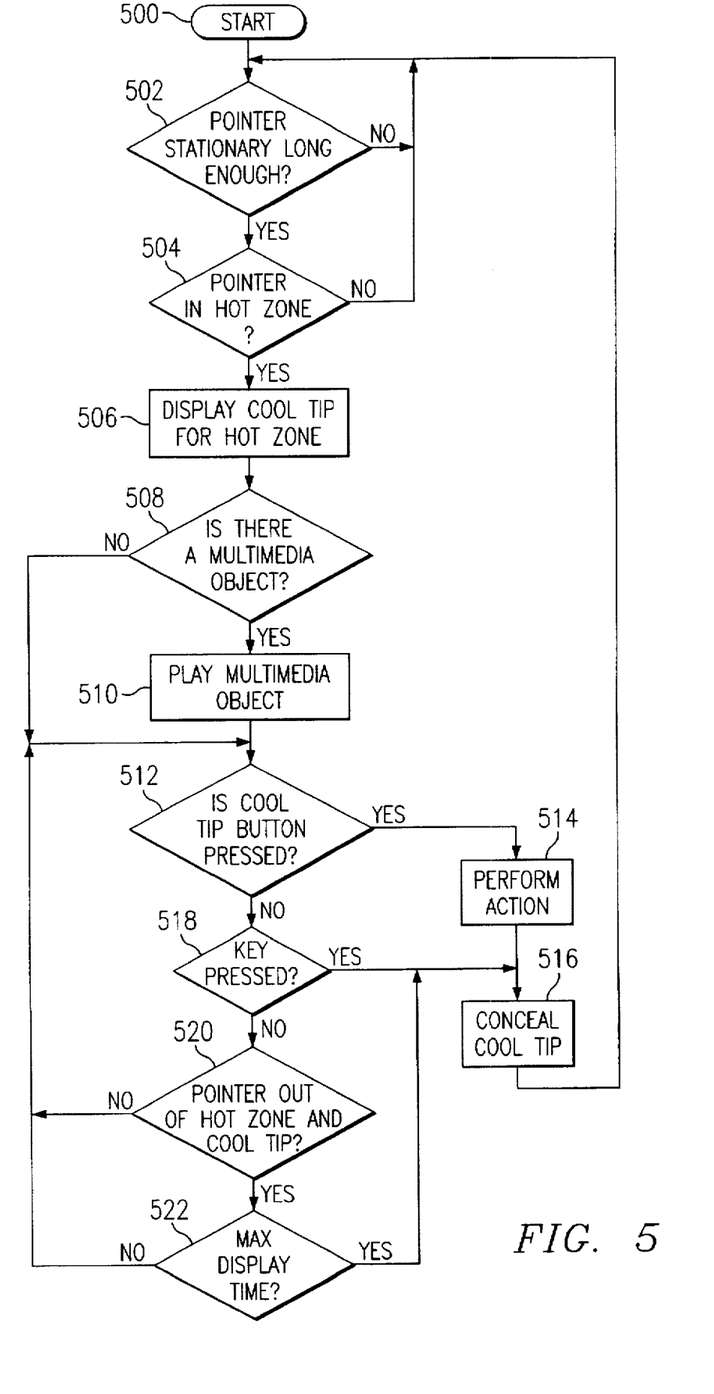
FIG. 5 is a flowchart illustrating a preferred method of implementing the pop-up help system of the present invention.

FIG. 5 is a flowchart of the method of implementing the help window 10 in accordance with the above-described features of the present invention. It should be understood that instructions for implementing the method are stored in storage media 22 (FIG. 1). Execution begins in step 500 upon initiation of the pop-up help system. In step 502, a determination is made whether the mouse pointer 26 has been held stationary for a sufficient amount of time to invoke a help window. It is understood that in one embodiment of the invention, the user may set the delay time period by means of the Delays page 420. If in step 502 it is determined that the mouse pointer 26 has not been stationary for a sufficient amount of time to invoke the help window, execution remains at step 502 until the mouse pointer 26 is stationary for a sufficient time to invoke the help window.

Upon a determination that the mouse pointer 26 has been stationary for a sufficient amount of time to invoke the help window, execution proceeds to step 504, in which a determination is made whether the mouse pointer 26 is located over a hot zone that has an help window associated therewith. If in step 504 it is determined that the mouse pointer 26 is not located over a hot zone, execution returns to step 502. If the mouse pointer 26 is located over a hot zone, execution proceeds to step 506 where the help window associated therewith is displayed.

After the help window is displayed in step 506, execution proceeds to step 508 where a determination is made whether there is a multimedia object, such as music or a movie, associated with the help window. If so, the multimedia object is executed in step 510; otherwise, execution proceeds to step 512.

In step 512, a determination is made whether a help window button has been selected. A button may be selected in conventional manner, including the user moving the mouse pointer 26 to rest on a button 10a and clicking, or the user placing the pointer over the button 10a and pressing the <ENTER> key. If a button has been selected, execution proceeds to step 514, in which an action associated with the button is performed. After execution of the action in step 514, execution proceeds to step 516, in which the help window is concealed and execution is returned to step 500. If in step 512 a button has not been selected, execution proceeds to step 518.

In step 518, a determination is made whether the user has depressed any key, other than a key which would activate a button in the help window, as determined in step 512. If a key has been depressed, execution proceeds to step 516, in which the help window is concealed and execution is returned to step 500. If a key has not been depressed, then execution proceeds to step 520. This enables a user to easily remove a help window from the desktop by merely pressing a key, such as the spacebar.

In step 520, a determination is made whether the mouse pointer 26 is still within the original hot zone or within the help window displayed in step 506. If the mouse pointer 26 is still within the hot zone or the help window, execution returns to step 512. If the mouse pointer 26 has moved out of the hot zone and the help window, execution proceeds to step 522.

In step 522, a determination is made whether the help window has been displayed for its maximum time. It is understood that in one embodiment of the invention the user may set the maximum display time by means of the Delays page 420. If the help window has not been displayed for its maximum time, then execution returns to step 512. If the help window has been displayed for its maximum time, execution proceeds to step 516, in which the help window is concealed and execution returns to step 500.

In the manner described above, a pop-up help system is provided that enjoys distinct advantages over previous help systems. In particular, the system of the present invention includes help windows that make full use of text formatting, e.g., bullets, fonts, other graphics, and can include graphical treatments, audio, animations and video. In addition, the hot area for initiating the help window may be any size or shape and the help window itself may be any number of different shapes. Moreover, interactive GDEs may be provided within the help window for facilitating direct access to other help windows providing additional information on a related topic. None of the foregoing features are currently available in a text box-type help system.

It is understood that the present invention can take many forms and embodiments, the embodiments shown herein are intended to illustrate rather than limit, the invention, it being understood that variations may be made without departing from the spirit of the scope of the invention. For example, the help window need not permit all of the variations suggested herein, and the help window may be displayed in connection with application program instructions, iconized or text, as well as with GUI menus and application icons. The help window need not contain merely help information, but could also provide marketing and other information. The help window need not necessarily operate within Windows operating environments and may instead be operated in other GUI environments.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method of operating a computer having a display, the method comprising the steps of:

display a graphical display element ("GDE") on said display;

detecting selection of said GDE;

responsive to selection of said GDE being detected, displaying on said display a help window associated with said GDE, said help window comprising help information regarding said GDE and supporting a plurality of text formatting options;

determining selection of said help window; and subsequent to said displaying said help window, responsive to a determination that both said GDE and said help window are not selected, concealing said help window.

2. The method of claim 1 further comprising, subsequent to said displaying said help window, responsive to a determination said help window has a multimedia object associated therewith, executing said associated multimedia object.

3. The method of claim 1 wherein said help window comprises at least one user-selectable button for executing an action, the method further comprising, subsequent to said displaying said help window, responsive to user selection of said at least one button, executing said action.

4. The method of claim 4 further comprising, subsequent to said determination that neither said GDE nor said help window is selected, waiting a first period of time prior to concealing said help window, wherein a length of said first time period is specified by a user.

5. The method of claim 1 wherein selection of an item from a group of items comprising said GDE and said help window is performed by positioning a mouse pointer over said item.

6. The method of claim 5 wherein said item remains selected only so long as said mouse pointer is positioned over said item.

7. The method of claim 1 further comprising, prior to said displaying said help window, responsive to a determination that said help window would be displayed on said display less than a minimum distance from one or more edges of said display, repositioning said help window on said display such that said displayed help window is located at least said minimum distance from said one or more display edges.

8. The method of claim 1 further comprising displaying a menu associated with said help window for enabling a user to specify a behavior of said help window.

9. A method of operating a computer having a display, the method comprising the steps of:

displaying a graphical display element ("GDE") on said display;

detecting selection of said GDE;

responsive to selection of said GDE being detected, displaying on said display a help window associated with said GDE, said help window comprising help information regarding said GDE and supporting a plurality of text formatting options; and subsequent to said detecting selection of said GDE, waiting a first period of time prior to performing said displaying said help window, wherein a length of said first time period is specified by a user.

10. A method of operating a computer having a display, the method comprising the steps of:

displaying a graphical display element ("GDE");

responsive to placement of a mouse pointer over said ODE, thereby to select said GDE, displaying a help window associated with said GDE, said help window comprising information regarding the operation of said GDE and supporting a plurality of text formatting options;

determining placement of said mouse pointer on said help window; and subsequent to said displaying said help window, responsive to movement of said mouse pointer off of said GDE and said help window, concealing said help window.

11. The method of claim 10 further comprising, subsequent to said displaying said help window, responsive to a determination that said help window has associated therewith a multimedia object, executing said multimedia object.

12. The method of claim 10 wherein said help window comprises at least one user-selectable button for executing an action, the method further comprising, subsequent to said displaying said help window, responsive to a determination that said at least one button has been selected, executing said action.

13. The method of claim 10 wherein said displaying said help window further comprises displaying said help window on said display such that said help window is located at least a minimum distance from at least one edge of said display.

14. A method of operating a computer having a display, the method comprising the steps of:

displaying a graphical display element ("GDE");

responsive to placement of a mouse pointer over said GDE, thereby to select said GDE, displaying a help window associated with said GDE, said help window comprising information regarding the operation of said GDE and supporting a plurality of text formatting options; and subsequent to said detecting selection of said GDE, waiting a first period of time prior to said displaying said help window, wherein a length of said first time period is specified by a user.

15. In a computer having a display screen, a system for implementing a help system, the system comprising:

means for displaying a graphical display element ("GDE");

means for detecting user selection of said GDE;

means responsive to user selection of said GDE for displaying a help window associated with said GDE, said help window comprising information regarding said GDE and supporting a plurality of text formatting options;

means for determining user selection of said help window; and means responsive to a determination that both said GDE and said help window are not selected for concealing said help window.

16. The system of claim 15 further comprising means responsive to a determination that a multimedia object is associated with said help window, executing said multimedia object.

17. The system of claim 15 wherein said help window comprises at least one user-selectable button for executing an action, the system further comprising means responsive to user selection of said at least one button for executing said action.

18. The system of claim 15 wherein selection of an item from a group of items comprising said GDE and said help window is performed by positioning a mouse pointer over said item.

19. The system of claim 18 wherein said item remains selected only so long as said mouse pointer is positioned over said item.

20. The system of claim 16 further comprising means for displaying said help window on said display at least a minimum distance from each edge of said display.

21. A help system for implementation on a computer comprising a display and an input device, said help system being for presentation on said display and comprising:

a graphical display element ("GDE");

a help window associated with said GDE and supporting a plurality of text formatting options;

wherein responsive to user selection of said GDE, said help window is displayed;

determining selection of said help window; and wherein responsive to a determination that both said GDE and said help window are not selected, said help window is concealed.

22. The help system of claim 21 wherein said help window comprises help information related to said GDE.

23. The help system of claim 21 wherein said help window as associated therewith a multimedia object that is executed subsequent to the display of said help window.

24. The help system of claim 21 wherein said help window comprises at least one user-selectable button for executing an action.

25. The help system of claim 21 wherein said help window is displayed only so long as said GDE or said help window is selected by a user.

26. The help system of claim 25 wherein said input device comprises a mouse and selection of an item from a group of items comprising said GDE and said help window is performed by positioning a mouse pointer over said item.

27. The help system of claim 25 wherein said input device comprises a keyboard.

28. The help system of claim 21 further comprising a pop-up menu comprising a plurality of menu picks for enabling a user to alter a behavior of said user interface.

29. The help system of claim 21 wherein said help window further comprises at least one button for opening other help windows.

30. The help system of claim 21 wherein said help window further comprises at least one button for executing applications.

* * * * *

UNITED STATES PATENT AND TRADEMARK OFFICE
CERTIFICATE OF CORRECTION

PATENT NO. : 5,754,176
DATED : May 19, 1998
INVENTOR(S) : Chris Crawford

Page 1 of 1

It is certified that error appears in the above-identified patent and that said Letters Patent is hereby corrected as shown below:

Column 8,
Line 40, change "ODE" to -- GDE --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*